US008770152B2

(12) United States Patent
Leeland et al.

(10) Patent No.: US 8,770,152 B2
(45) Date of Patent: Jul. 8, 2014

(54) WATER HEATER WITH PARTIALLY THERMALLY ISOLATED TEMPERATURE SENSOR

(75) Inventors: Shanna Lorraine Leeland, St. Paul, MN (US); Radomir Svoboda, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 1212 days.

(21) Appl. No.: 12/255,592

(22) Filed: Oct. 21, 2008

(65) Prior Publication Data

US 2010/0095906 A1 Apr. 22, 2010

(51) Int. Cl.
*F24H 9/20* (2006.01)

(52) U.S. Cl.
USPC .... 122/14.22; 122/14.2; 122/14.1; 122/13.01

(58) Field of Classification Search
USPC .............................. 122/14.22, 14.2
See application file for complete search history.

(56) References Cited

U.S. PATENT DOCUMENTS

| | | | |
|---|---|---|---|
| 3,402,886 A * | 9/1968 | Jackson | 236/21 B |
| 3,847,350 A | 11/1974 | Thompson | |
| 3,849,350 A | 11/1974 | Matsko | |
| 4,324,944 A | 4/1982 | Weihrich et al. | |
| RE30,936 E | 5/1982 | Kmetz et al. | |
| 4,333,002 A | 6/1982 | Kozak | |
| 4,467,178 A | 8/1984 | Swindle | |
| 4,508,261 A | 4/1985 | Blank | |
| 4,511,790 A | 4/1985 | Kozak | |
| 4,568,821 A | 2/1986 | Boe | |
| 4,588,875 A | 5/1986 | Kozak et al. | |
| 4,674,901 A * | 6/1987 | Lorenz | 374/169 |
| 4,692,598 A | 9/1987 | Yoshida et al. | |
| 4,696,639 A | 9/1987 | Bohan, Jr. | |
| 4,734,658 A | 3/1988 | Bohan, Jr. | |
| 4,742,210 A | 5/1988 | Tsuchiyama et al. | |
| 4,770,629 A | 9/1988 | Bohan, Jr. | |
| 4,834,284 A | 5/1989 | Vandermeyden | |
| 4,888,953 A * | 12/1989 | Fukayama et al. | 60/657 |
| 4,984,981 A | 1/1991 | Pottebaum | |
| 4,986,468 A | 1/1991 | Deisinger | |

(Continued)

FOREIGN PATENT DOCUMENTS

| EP | 0356609 | 3/1990 |
|---|---|---|
| EP | 0699316 | 7/1999 |

(Continued)

OTHER PUBLICATIONS

U.S. Appl. No. 10/911,151, filed Aug. 3, 2004.

(Continued)

*Primary Examiner* — Kang Hu
*Assistant Examiner* — Nathaniel Herzfeld
(74) *Attorney, Agent, or Firm* — Seager, Tufte, Wickhem LLC

(57) ABSTRACT

A water heater having a water tank and a heating source disposed proximate to the water tank such that the heating source may heat water within the water tank. A temperature sensor is provided that is partially thermally isolated from the water in the water tank. A controller may be provided that at least partially compensates for the partial thermal isolation of the temperature sensor and regulates the heating source. In some instances, the temperature sensor may be at least partially disposed within a thermally isolating mass.

19 Claims, 17 Drawing Sheets

(56) References Cited

U.S. PATENT DOCUMENTS

| | | |
|---|---|---|
| 5,007,156 A | 4/1991 | Hurtgen |
| 5,080,496 A * | 1/1992 | Keim et al. ............. 374/144 |
| 5,103,078 A | 4/1992 | Boykin et al. |
| 5,442,157 A | 8/1995 | Jackson |
| 5,622,200 A | 4/1997 | Schulze |
| 5,660,328 A | 8/1997 | Momber |
| 5,779,143 A | 7/1998 | Michaud et al. |
| 5,797,358 A | 8/1998 | Brandt et al. |
| 5,896,089 A | 4/1999 | Bowles |
| 5,968,393 A | 10/1999 | Demaline |
| 5,975,884 A | 11/1999 | Dugger |
| 6,053,130 A | 4/2000 | Shellenberger |
| 6,059,195 A | 5/2000 | Adams et al. |
| 6,069,998 A | 5/2000 | Barnes et al. |
| 6,075,923 A | 6/2000 | Wu |
| 6,178,291 B1 * | 1/2001 | Zenios et al. ............ 392/479 |
| 6,182,944 B1 * | 2/2001 | Veronese et al. ......... 251/144 |
| 6,208,806 B1 | 3/2001 | Langford |
| 6,212,894 B1 | 4/2001 | Brown et al. |
| 6,261,087 B1 | 7/2001 | Bird et al. |
| 6,271,505 B1 | 8/2001 | Henderson |
| 6,293,471 B1 | 9/2001 | Stettin et al. |
| 6,350,967 B1 | 2/2002 | Scott |
| 6,363,218 B1 | 3/2002 | Lowenstein et al. |
| 6,371,057 B1 * | 4/2002 | Henderson ............... 122/14.2 |
| 6,375,087 B1 | 4/2002 | Day et al. |
| RE37,745 E | 6/2002 | Brandt et al. |
| 6,553,946 B1 * | 4/2003 | Abraham et al. ........ 122/14.22 |
| 6,560,409 B2 | 5/2003 | Troost, IV |
| 6,633,726 B2 | 10/2003 | Bradenbaugh |
| 6,701,874 B1 | 3/2004 | Schultz et al. |
| 6,795,644 B2 | 9/2004 | Bradenbaugh |
| 6,861,621 B2 | 3/2005 | Ghent |
| 6,880,493 B2 | 4/2005 | Clifford |
| 6,934,862 B2 | 8/2005 | Sharood et al. |
| 6,936,798 B2 | 8/2005 | Moreno |
| 6,955,301 B2 | 10/2005 | Munsterhuis et al. |
| 6,959,876 B2 | 11/2005 | Chian et al. |
| 7,088,238 B2 | 8/2006 | Karaoguz et al. |
| 7,117,825 B2 | 10/2006 | Phillips |
| 7,162,150 B1 * | 1/2007 | Welch et al. ............. 392/455 |
| 7,221,862 B1 | 5/2007 | Miller et al. |
| 7,252,502 B2 | 8/2007 | Munsterhuis |
| 7,317,265 B2 | 1/2008 | Chian et al. |
| 2002/0145008 A1 * | 10/2002 | Jones et al. ............. 222/146.5 |
| 2003/0196610 A1 * | 10/2003 | Hughes et al. .......... 122/155.2 |
| 2004/0042772 A1 | 3/2004 | Whitford et al. |
| 2004/0267385 A1 | 12/2004 | Lingemann |
| 2005/0077368 A1 | 4/2005 | Zak et al. |
| 2005/0147401 A1 | 7/2005 | Baxter |
| 2005/0147402 A1 | 7/2005 | Baxter |
| 2005/0150967 A1 | 7/2005 | Chapman, Jr. et al. |
| 2006/0150926 A1 * | 7/2006 | Donnelly et al. ......... 122/14.2 |
| 2006/0215731 A1 * | 9/2006 | Gadonniex et al. ....... 374/208 |
| 2006/0243816 A1 | 11/2006 | Teti |
| 2007/0000908 A1 * | 1/2007 | Bohan et al. ............. 219/505 |
| 2007/0023333 A1 | 2/2007 | Mouhebaty et al. |
| 2007/0034169 A1 * | 2/2007 | Phillips ................... 122/14.1 |
| 2007/0191994 A1 | 8/2007 | Patterson et al. |
| 2007/0246551 A1 | 10/2007 | Phillips et al. |
| 2007/0295823 A1 | 12/2007 | Yamada et al. |
| 2008/0023564 A1 | 1/2008 | Hall |
| 2008/0188995 A1 | 8/2008 | Hotton et al. |
| 2009/0141771 A1 * | 6/2009 | Owen et al. ............. 374/178 |
| 2009/0192748 A1 * | 7/2009 | Palmer et al. ............. 702/99 |

FOREIGN PATENT DOCUMENTS

| | | |
|---|---|---|
| GB | 2211331 | 6/1999 |
| JP | 8264469 | 10/1996 |
| JP | 2008008548 | 1/2008 |

OTHER PUBLICATIONS

Lennox, "Network Control Panel, User's Manual," 18 pages, Nov. 1999.

Moog, "M3000 Control System, RTEMP 8, Remote 8-Channel Temperature Controller with CanOpen Interface," 6 pages, Nov. 2004.

* cited by examiner

WATER HEATER WITH PARTIALLY THERMALLY ISOLATED TEMPERATURE SENSOR

TECHNICAL FIELD

The disclosure pertains generally to water heaters and more particularly to water heaters that may have a temperature sensor that is at least partially thermally isolated from the water in the interior of the water heater.

BACKGROUND

Water heaters are used in homes, businesses and just about any establishment having the need for heated water. A conventional water heater typically has at least one heating element or "heater," such as a gas-fired and/or electric burner. Each water heater also typically has at least one thermostat or controller for controlling the heater. The controller often receives signals related to the temperature of the water within the water heater, oftentimes from a temperature sensor that is thermally engaged with the water in the water heater. In some instances, a water heater may operate in accordance with a first temperature set point and a second temperature set point. The difference between the first and second temperature set point may be referred to as the differential of the water heater.

When temperature signals from the temperature sensor indicate that the water temperature is below a first set point, for example, when the water temperature is below about 120° F., the controller turns on the heater and the water within the water heater begins to heat. After some time, the water temperature within the water heater will increase to a second set point, which, for example, may be about 140° F. At this point, the controller typically causes the heater to reduce its heat output or, alternatively, causes the heater to turn off. This heat cycle begins again when the water temperature within the water heater drops below the first set point.

Typically, the temperature sensor protrudes into and thermally engages the water in the water heater. Sometimes, the sensor is disposed within a metallic well such as a brass, copper or combination of brass and copper well that itself protrudes into and directly engages the water in the water heater. Because metals such as brass and copper have high coefficients of thermal conductivity, the brass or copper well is efficient at conducting thermal energy from the water to the temperature sensor. Therefore, the temperature sensor can provide a temperature signal that closely tracks the actual water temperature within the water heater. Some temperature sensors, such as in electric water heaters, may be in direct contact with the water.

While metallic wells such as brass wells provide good thermal conductivity between the temperature sensor and the water within the water heater, they can be relatively expensive. Thus, there is a need for a water heater that has a less expensive temperature sensor configuration.

SUMMARY

The present disclosure pertains generally to a water heater having a temperature sensor configuration that is less expensive than a typical brass, copper or combination metal well temperature sensor and that may have manufacturing and/or assembly advantages. An illustrative but non-limiting example of the disclosure may be found in a water heater that has a water tank and a heating source that is disposed proximate the water tank such that the heating source may heat water within the water tank. The water heater may include a controller that is configured to regulate the heating source and a temperature sensor that is at least partially thermally isolated from the water in the water tank. In some instances, for example, the temperature sensor may be at least partially disposed within a partially thermally isolating mass, such as a non-metallic well. In another instance, the temperature sensor may be mounted or otherwise thermally connected to the outside of the water tank but inside of any insulation disposed about the water tank, but these are only example temperature sensor configurations.

Another illustrative but non-limiting example of the disclosure may be found in a water heater temperature sensing unit. The sensing unit may include a temperature sensor and a polymeric body that is configured to extend into a sensing aperture of a water tank. The polymeric body may include an extended portion that is configured to accommodate the temperature sensor therein and extend into the water tank. In some cases, the polymeric body may also form part of the housing of a gas valve of the water heater, but this is not required.

Another illustrative but non-limiting example of the disclosure may be found in a method of controlling the water temperature within a water heater water tank. The water heater may include a heat source and a temperature sensor that is at least partially thermally isolated from the water in the water tank. A temperature signal provided by the at least partially thermally isolated temperature sensor may be monitored. A command temperature, which may be different from the temperature signal received from the at least partially thermally isolated temperature sensor in time and/or magnitude may be determined by processing the temperature signal received from the at least partially thermally isolated temperature sensor to account and/or compensate for the thermal isolation of the temperature sensor. The heat source may be controlled in accordance with the command temperature. In some cases, accounting for the thermal isolation of the partially thermally isolated temperature sensor may include utilizing a first order lag, a second order lag or even a third order lag to determine the command temperature.

The above summary is not intended to describe each and every disclosed embodiment or every implementation of the disclosure. The Description that follows more particularly exemplify the various illustrative embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
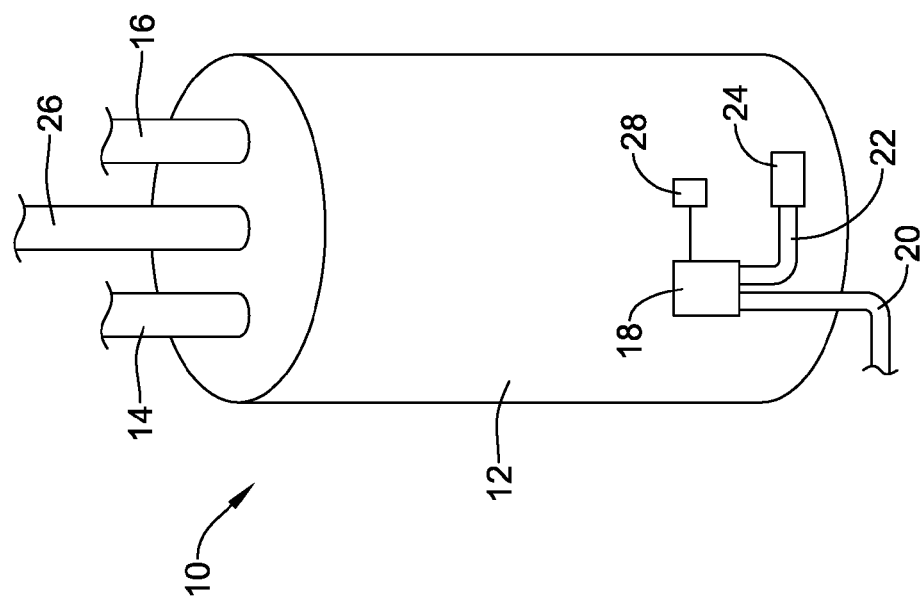
FIG. 1 is a schematic view of an illustrative but non-limiting water heater in accordance with the present disclosure.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 provides a schematic view of an illustrative but non-limiting water heater 10. Water heater 10 includes a water tank 12. The water tank 12 may include an insulating layer (not explicitly shown) positioned about the water tank 12 to help reduce thermal losses from the water tank 12. Cold water enters water tank 12 through a cold water line 14 and is heated by a gas burner 24. In some cases, the water heater 10 may include an electric heating element rather than a gas burner 24. In any event, the resulting heated water exits through a hot water line 16. A gas control unit 18 regulates gas flow from a gas source 20 through a combustion gas line 22 and into gas burner 24. A flue 26 permits combustion byproducts to safely exit.

Water heater 10 includes a temperature sensor 28. In some cases, temperature sensor 28 may enter water tank 12 at a location laterally offset from gas control unit 18. In some instances, however, temperature sensor 28 may instead be located behind gas control unit 18. In either case, water tank 12 may include an aperture 30 that is sized and configured to accept temperature sensor 28. This can be seen in FIG. 2, in which certain elements of FIG. 1 have been removed for clarity. Aperture 30 may be configured to accept a temperature sensor such as temperature sensor 28 that has a compression or frictional fit within aperture 30. In some cases, aperture 30 may include threads that are configured to accommodate corresponding matching threads on temperature sensor 28.

Figure 2:
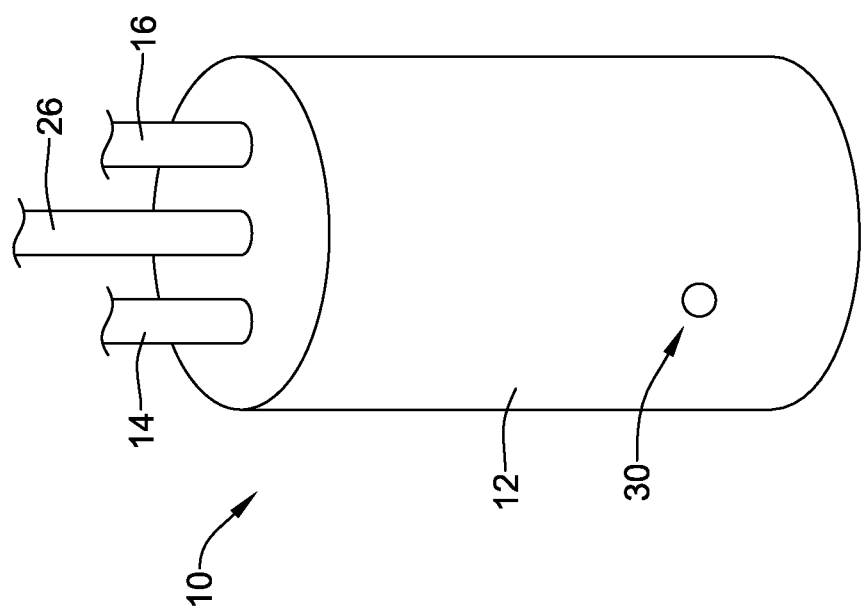
FIG. 2 is a schematic view of an illustrative but non-limiting water heater in accordance with the present disclosure.
Figure 3:
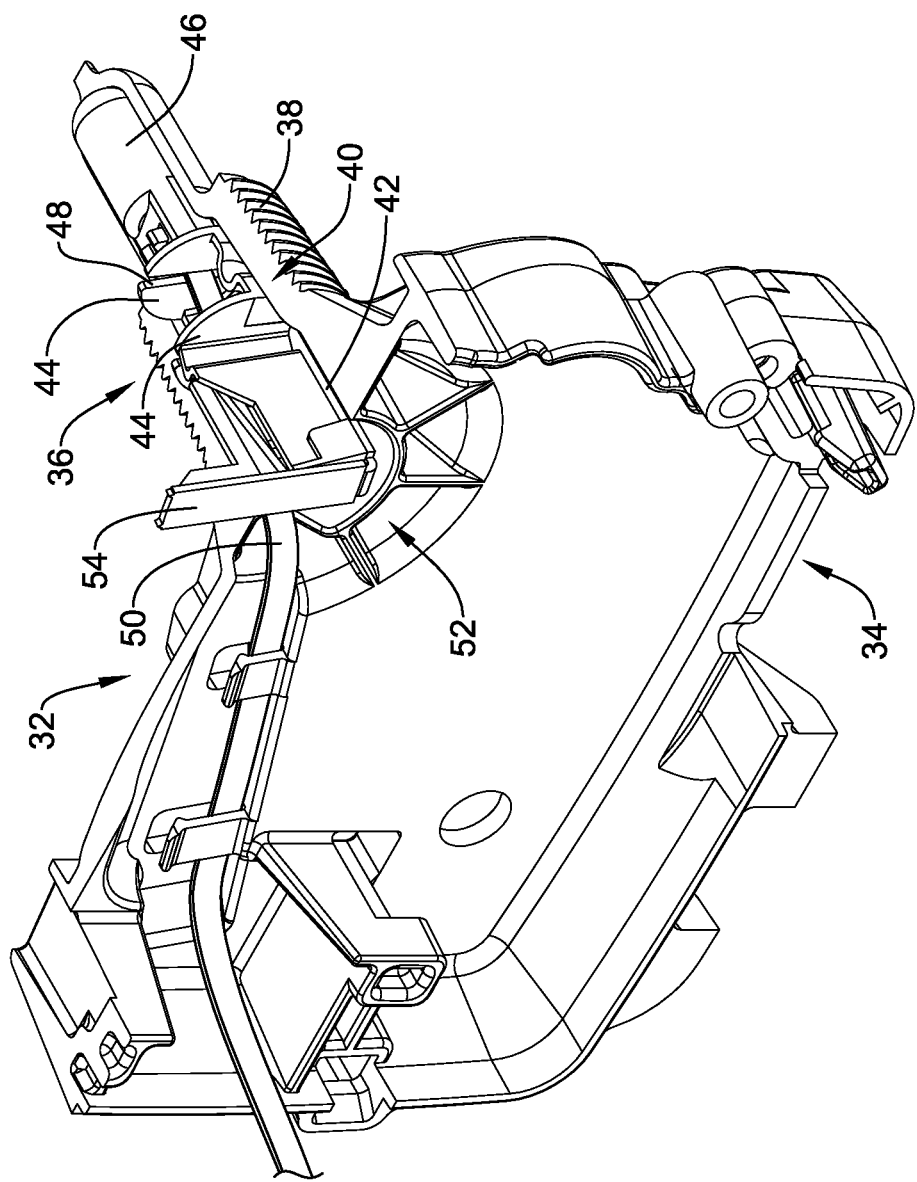
FIG. 3 is a schematic view of an illustrative but non-limiting temperature sensing assembly that may be used in conjunction with the water heater of FIG. 1.

FIG. 3 provides a partial cross-sectional perspective view of an illustrative temperature sensing assembly 32 that may be used in conjunction with water heater 10. In the illustrative embodiment, temperature sensing assembly 32 includes a gas valve housing portion 34 and a sensor portion 36. Valve housing portion 34 may form at least a portion of the housing of a gas control unit, such as gas valve unit 18 of FIG. 1. In some instances, as illustrated, sensor portion 36 may include a threaded portion 38 that can be used to secure temperature sensing assembly 32 to or within aperture 30 (FIG. 2). It will be appreciated that temperature sensing assembly 32 may provide manufacturing and/or assembly advantages. For example, temperature sensing assembly 32 may be formed of any suitable material including non-metallic materials such as a polymeric material, glass, ceramic, and the like. This may result in a temperature sensor 46 that is partially thermally isolated from the water in the water heater tank 12, but may be less expensive to produce than a metallic well.

Sensor portion 36 may be configured to accommodate several components of interest. For example, sensor portion 36 may be configured to accommodate a sensor assembly 40 that includes an assembly structure 42. One or more heat traps 44 may be attached or otherwise secured to assembly structure 42, and may help serve to limit or at least partially limit heat flow further into temperature sensing assembly 32. Assembly structure 42 may be configured to accommodate the temperature sensor 46. In some cases, temperature sensor 46 may be a single temperature sensor. In other instances, temperature sensor 46 may include multiple temperature sensors, which may provide a measure of redundancy and/or increased accuracy in a corresponding temperature measurement.

During assembly, it will be appreciated that heat traps 44 and sensor 46 may be attached to assembly structure 42. These may be accomplished by snap fits, frictional fits, glue, screws, rivets, or any other suitable attachment mechanism. In some instances, heat traps 44 may be integrally molded or otherwise formed as part of assembly structure 42. In some cases, the heat traps 44 may each include a slot 48 in order to accommodate and/or secure a wiring harness 50 for the temperature sensor 46. Once heat traps 44 and sensor 46 have been secured or otherwise attached to assembly structure 42, assembly structure 42 may be inserted into a void 52 that is molded or otherwise formed within sensor portion 36. It can be seen that assembly structure 42 may include one or more protrusions such as protrusion 54 that may help to locate assembly structure 42 within void 52 and/or limit penetration of assembly structure 42 into void 52.

Figure 4:
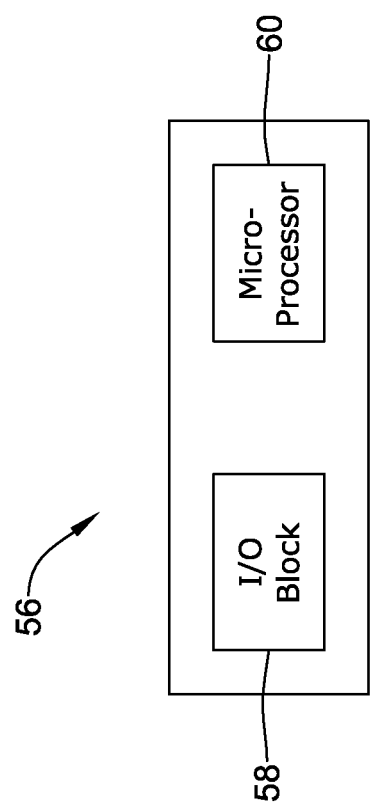
FIG. 4 is a block diagram of a controller that may be used in conjunction with the water heater of FIG. 1.

Returning briefly to FIG. 1, it will be appreciated that gas control unit 18 may include a controller. FIG. 4 is a block diagram of an illustrative controller 56 that may be considered as being a portion of gas control unit 18, or separate from gas control unit 18. Controller 56 may have several components. In some cases, controller 56 may have an INPUT/OUTPUT block 58 that accepts signals from temperature sensor 28 (FIG. 1) and/or temperature sensing assembly 32 (FIG. 3). If water heater 10 is in communication with an external thermostat or other HVAC controller, INPUT/OUTPUT block 58 may accommodate externally-derived control signals, and/or provide status and/or other information, as desired. In some cases, INPUT/OUTPUT block 58 may provide appropriate command signals to an electrically controlled gas valve (not illustrated) within gas control unit 18.

Controller 56 may include a microprocessor 60 that may be configured to accept appropriate signals from INPUT/OUTPUT block 58 and to determine appropriate output signals that can be outputted via INPUT/OUTPUT block 58, such as to other components within gas control unit 18 (FIG. 1) and/or to an external thermostat or other HVAC controller. Microprocessor 60 may be programmed to accept a temperature signal from temperature sensing assembly 32 (FIG. 3) and to calculate or otherwise determine a command temperature that alters the temperature value received from the temperature sensing assembly 32 in order to account or compensate for temperature differentials and/or thermal lag caused by the partial thermal isolation of the temperature sensor 46 from the water in the water heater tank 12. While not explicitly illustrated, microprocessor 60 may also include memory and/or other components.

In some instances, there may be a mathematical relationship between a temperature measured by temperature sensing assembly 32 (FIG. 3) and the actual water temperature within water tank 12 (FIG. 1). This mathematical relationship and/or algorithm may be programmed into controller 56 to calculate or otherwise determine the command temperature. The mathematical relationship and/or algorithm may be an exact mathematical relationship or it may be an approximated mathematical relationship or other algorithm that may be determined via modeling. It has been determined that in some cases, a first, second or third order lag may be useful in estimating the thermal lag. In some cases, a Z Transform, similar to a Laplace Transform, may be useful.

In particular cases, such as that illustrated in the experimental section discussed below, it has been determined that the actual water temperature may be calculated from a temperature value obtained from a temperature sensor that is partially thermally isolated from the water within water tank 12 (FIG. 1). One approach results from a using a first order lag, and is represented by the following equation:

$$t_{internal} = t_{surface1} + (t_{surface2} - t_{surface1})/m,$$

in which $t_{internal}$ is the calculated internal (or actual) water temperature, $t_{surface1}$ and $t_{surface2}$ represent temporally spaced temperature measurements by the partially thermally isolated temperature sensing assembly 32 (FIG. 3), and m is $(1-e^{-t1/tau})$. The variable t1 represents a temperature value and tau is a constant in this example. T1 and tau may vary depending on particular characteristics of the water heater used, thereby changing m.

Also, m may change depending on the current mode of operation of the water heater. For example, m may have a first value when the water heater is in a draw mode, and a different value when the water heater is in a recovery mode. In some instances, the value of m may depend at least in part upon a rate at which hot water is being drawn from the water heater. This may be determined, for example, by determining a rate at which the water temperature is dropping. When in standby mode, it has been determined that in some cases there is a set temperature differential between actual water temperature and water temperature measured by the partially thermally isolated temperature sensor (called external or surface temperature). These relationships are illustrated below with respect to FIGS. 5-15.

In some instances, the actual water temperature may be calculated using a Z Transform (second order lag) to calculate the actual water temperature from a temperature value obtained from a temperature sensor that is partially thermally isolated from the water within water tank 12 (FIG. 1). In this situation, the following equation is believed to be useful:

$$t = t_{surface} + (t_{air} - t_{surface})/(Ct*Ri) + (t_{internal} - t_{surface})/(Ct*Rt),$$

in which t is the calculated temperature, $t_{air}$ is an ambient or environmental temperature value, $t_{surface}$ is a temperature value provided by the at least partially thermally isolated temperature sensor, Ct is a thermal capacity value, Ri represents the thermal resistance of the tank insulation, Rt represents the thermal resistance of the tank wall, and $t_{internal}$ represents a previously-calculated internal temperature. A temperature sensor used to provide $t_{air}$ may be mounted near the water heater, such as on a printed circuit board that may, for example, include controller 56 (FIG. 4). In other instances, it is contemplated that the temperature sensor may be mounted or otherwise positioned exterior to the water heater.

In order to program the controller to properly account for the temperature differential and time lags between a temperature measured by the thermally isolated temperature sensor and an actual water temperature within a water heater, experiments were conducted to quantify these values. In the experiments, the partially thermally isolated temperature sensor was included within a non-metallic well, similar to that shown in FIG. 3.

A water heater was set up with an internal temperature sensor for directly measuring the water temperature inside of the tank, as well as three external (e.g. partially thermally isolated) temperature sensors. All four sensors were located at the same tank height, approximately equal to the bottom end of the hot water supply pipe. In all cases, the values from the three external (e.g. partially thermally isolated) temperature sensors were averaged to yielding a more accurate and/or more consistent temperature result.

Figure 5:
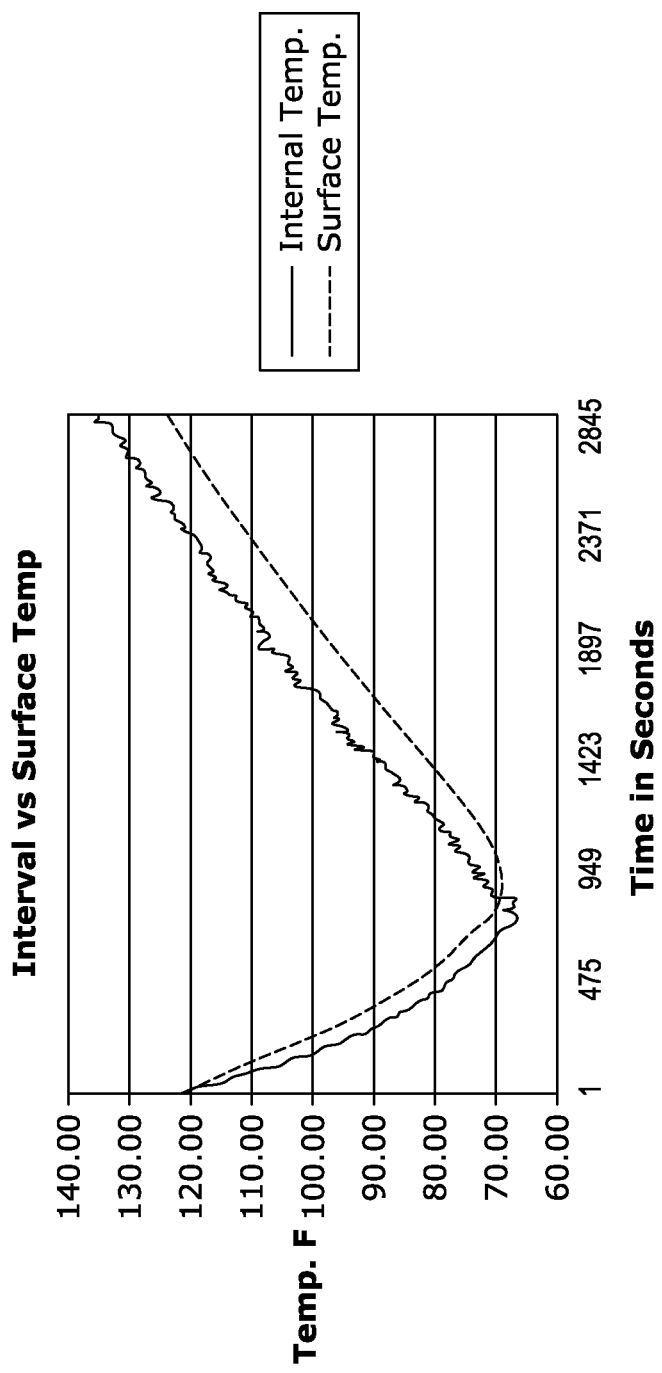
FIGS. 5-15 provide a graphical representation of experimental data inferring a method of compensating for a thermally isolated temperature sensor.

A number of experimental runs were conducted in which a 3 gallons per minute draw was conducted for ten to twelve minutes while data was collected. As can be seen in FIG. 5, the internal or actual water temperature drops faster than that indicated by the external partially thermally isolated temperature sensors during a draw. During the recovery period, the internal or actual water temperature increases faster than that indicated by the external partially thermally isolated temperature sensors. In some cases, as illustrated in FIG. 5, there is a larger temperature differential during recovery than there is during a draw period. It can also be seen that there is a time lag, i.e., a lag between when the internal temperature sensor indicates that the recovery period has begun and when the external partially thermally isolated temperature sensors indicate that the recovery period has begun.

Figure 6:
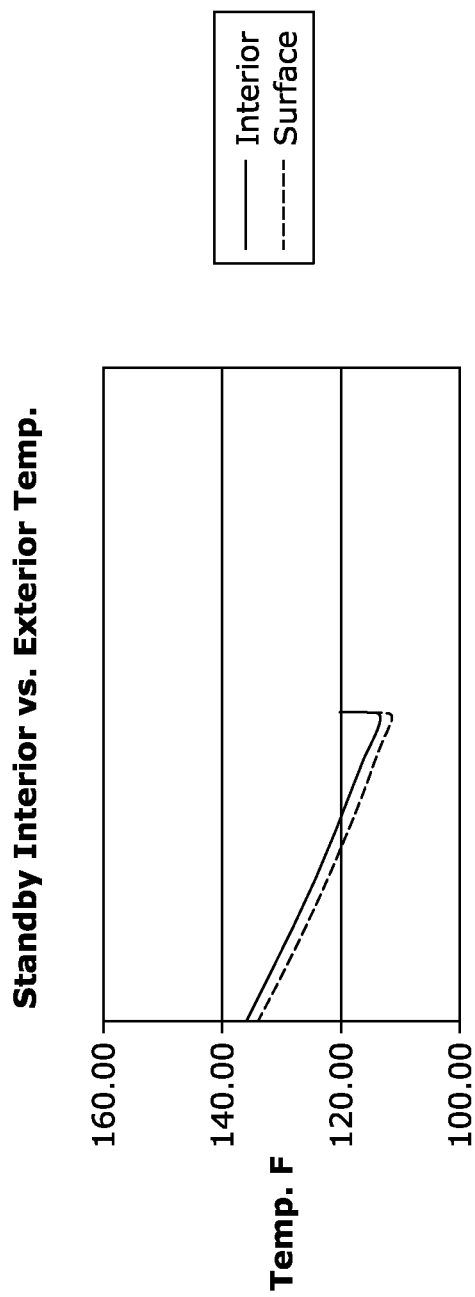

FIG. 5 provides a graphical representation of what happens during a draw period and during recovery. The remaining period of interest is the standby mode. FIG. 6 provides a graphical representation of the temperature differential between the internal or actual water temperature and what is indicated by the external partially thermally isolated temperature sensors. In the particular case shown, there is about a 2° F. temperature differential. It will be appreciated, however, that this is at least somewhat dependent upon tank particulars such as level of insulation around the tank, and thus other water heaters may exhibit a different temperature differential during standby. FIGS. 5 and 6 provide a graphical representation of the actual temperature differences between the internal and external partially thermally isolated temperature sensor measurements. The following Figures provide an illustrative but non-limiting insight into the mathematical modeling that may be useful to quantify these temperature relationships and thus better program the controller.

Figure 7:
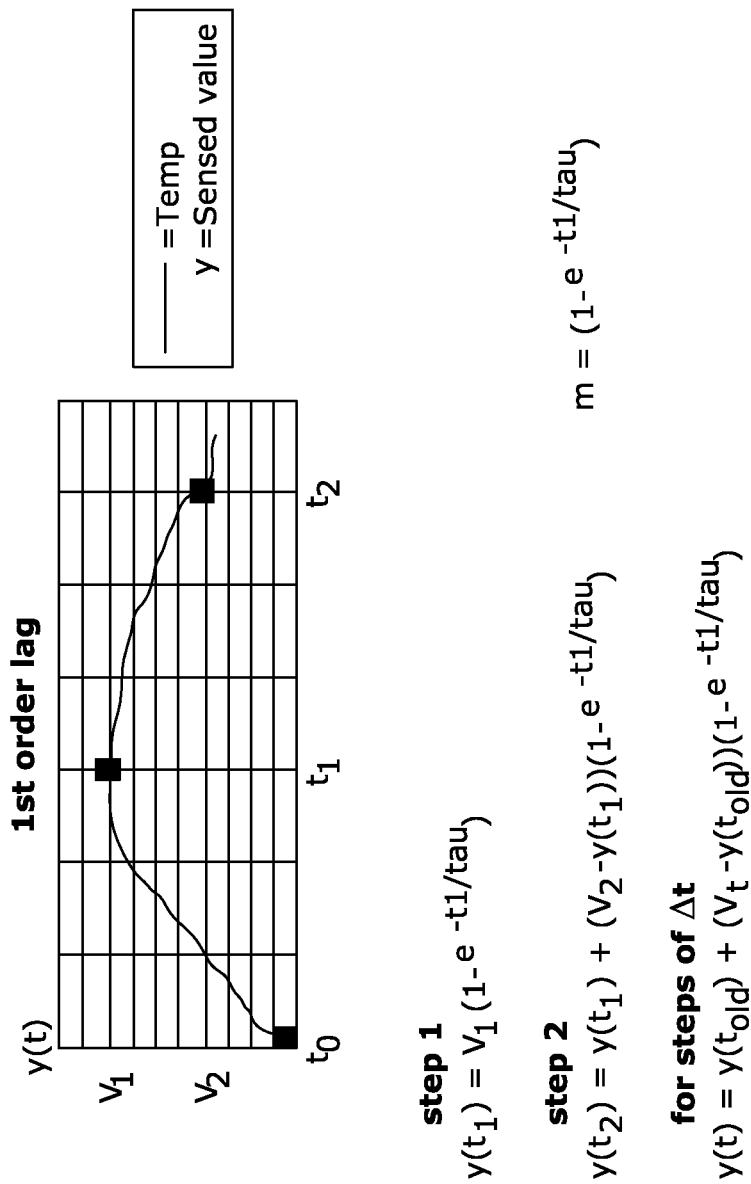

FIG. 7 represents an illustrative modeling attempt using a first order lag. The illustrative first order lag model took the form:

$$y(t) = y(t_{old}) + (V_t - y(t_{old}))(1 - e^{-t1/tau})$$

for steps of $\Delta t$, where $V_t$ is a function of time and represents the temperature value at that time, and tau is the time constant. Like above, a variable m may be created for easy substitution of $1/(1-e^{-t1/tau})$ with a variable T representing tau, resulting in:

$$y(t) = y(t_{old}) + (V_t - y(t_{old}))/m$$

Figure 8:
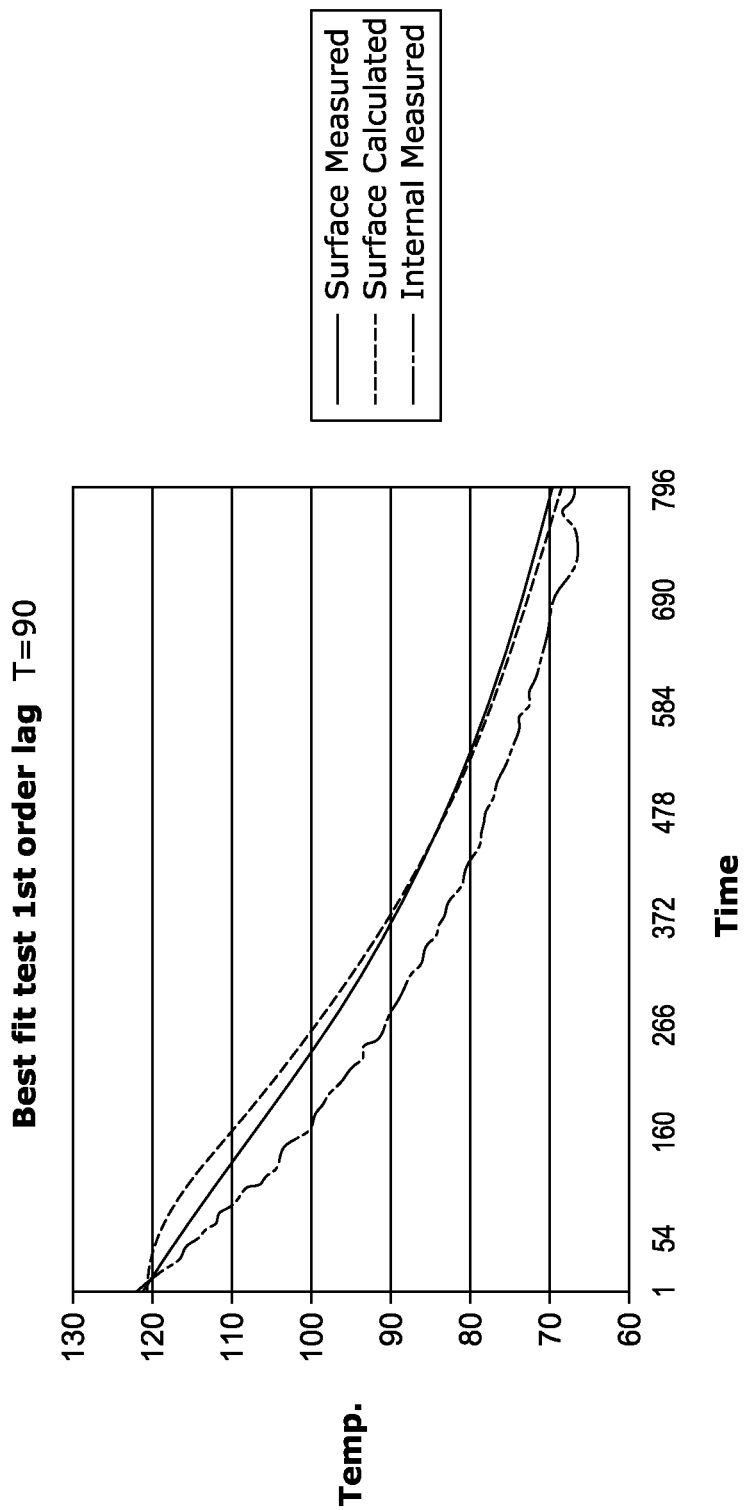
Figure 9:
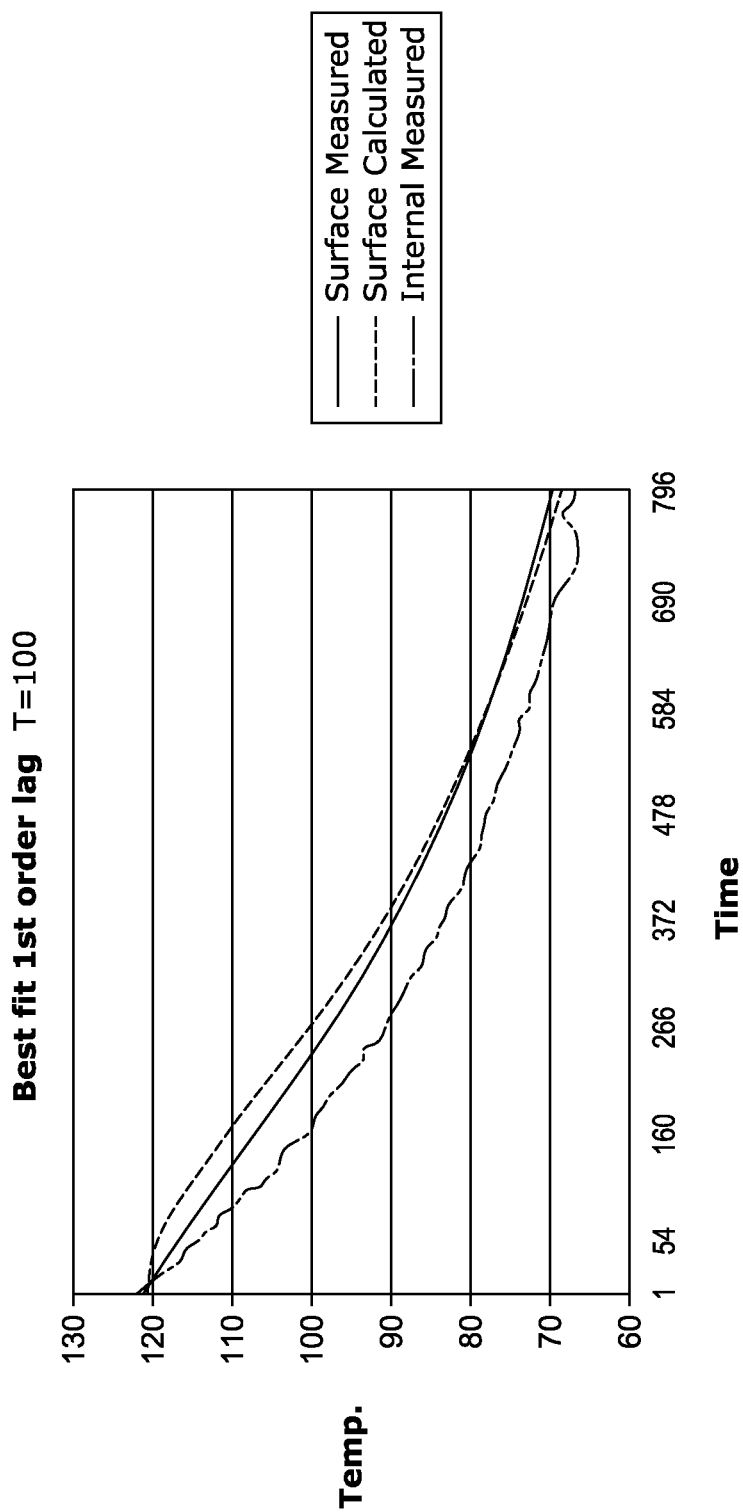
Figure 10:
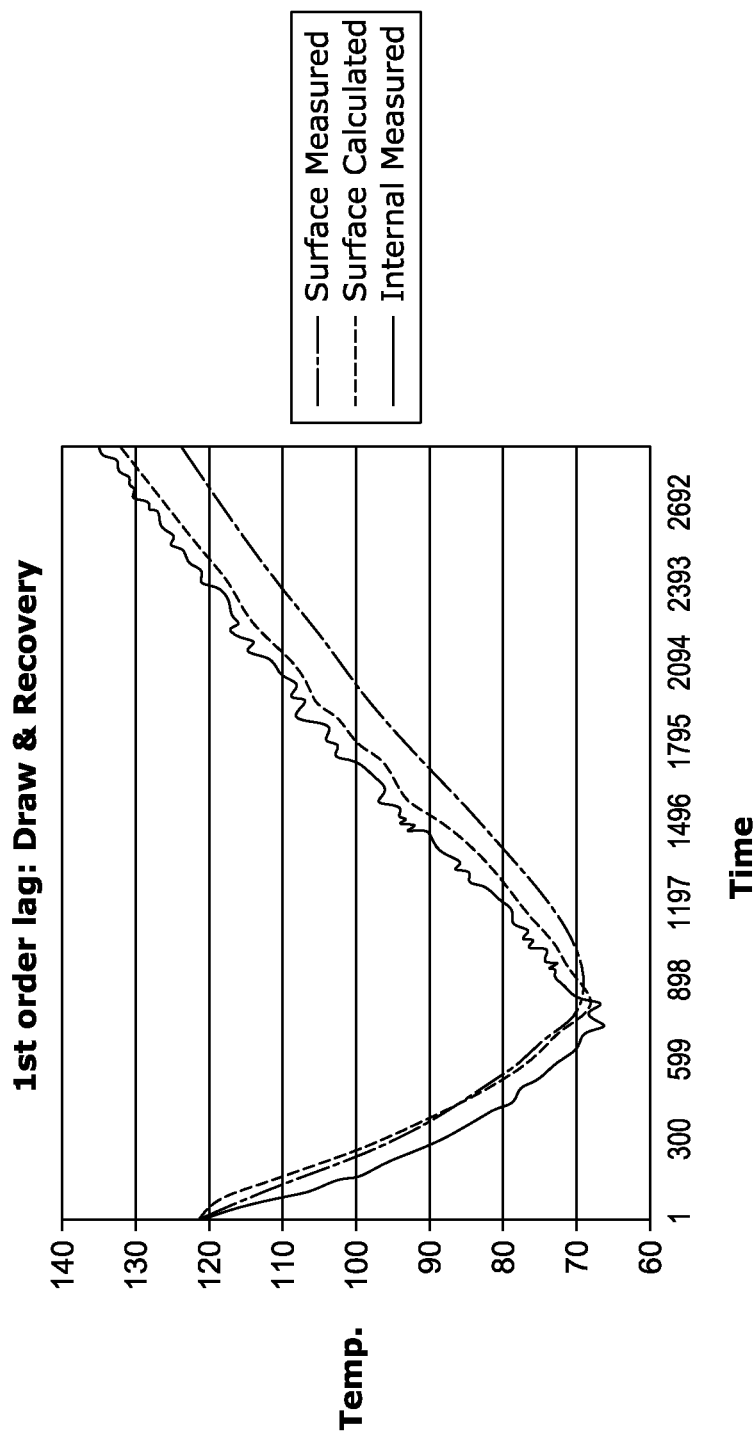

FIGS. 8 and 9 show the previously-obtained draw data (internal and external temperature values) as well as a calculated temperature representing the external temperature as calculated from the actual internal temperature. In FIGS. 8 and 9, the ambient air temperature was 70° F. and Rt was set equal to 10. In FIG. 8, tau (or T) was set equal to 90, Ct was set equal to 10 and Ri was set equal to 300. In FIG. 9, tau (T) was set equal to 100, Ct was set equal to 12 and Ri was set equal to 150. In FIG. 10, the first order lag model was extended to include recovery data, with similar results.

Figure 11:
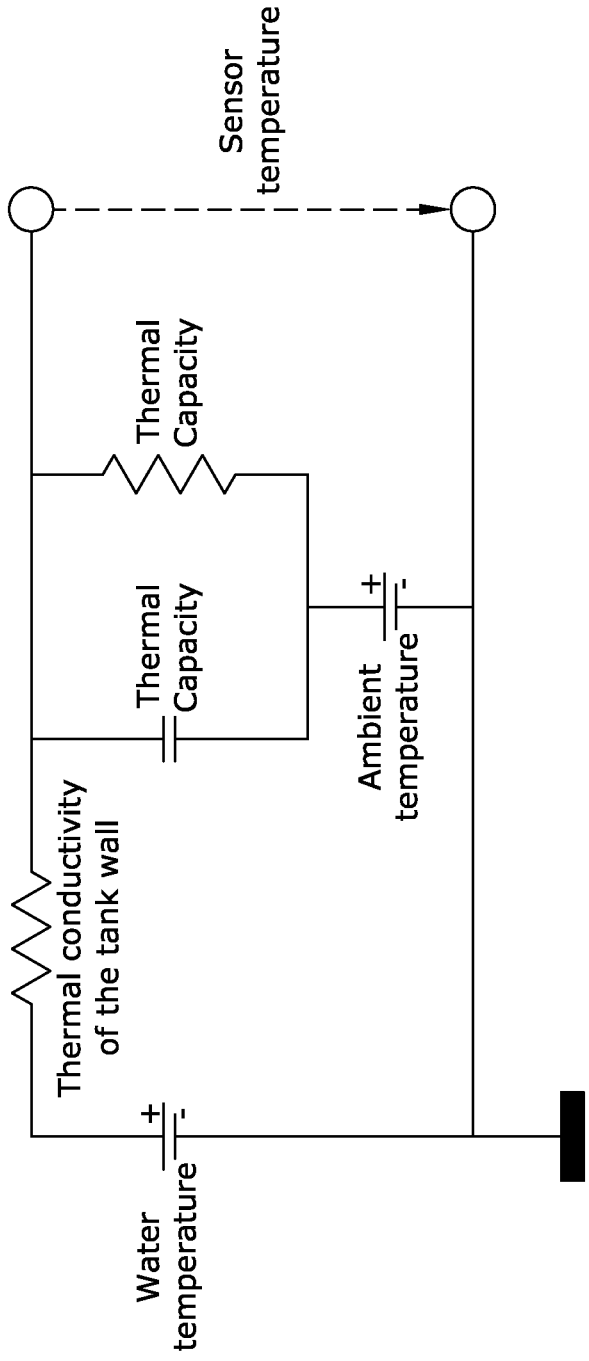

Modeling was also done using a Z space transform. FIG. 11 provides the basis for this modeling. It can be seen that the ambient air temperature, $t_{air}$, may be a factor in determining the actual water temperature. Based on the modeling, the following equation is believed to be appropriate:

$$t = t_{surface} + (t_{air} - t_{surface})/(Ct^*Ri) + (t_{internal} - t_{surface})/(Ct^*Rt).$$

Figure 12:
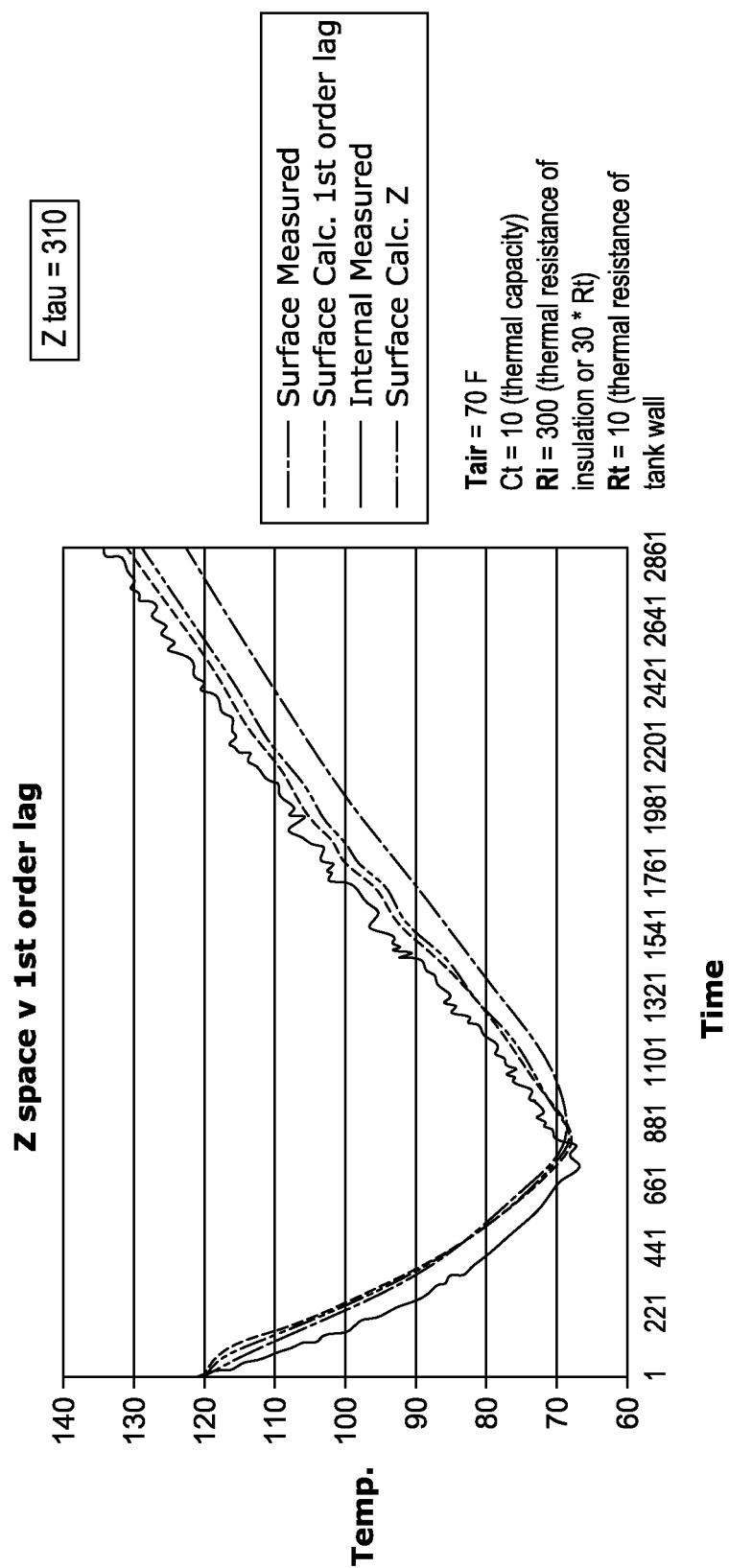
Figure 13:
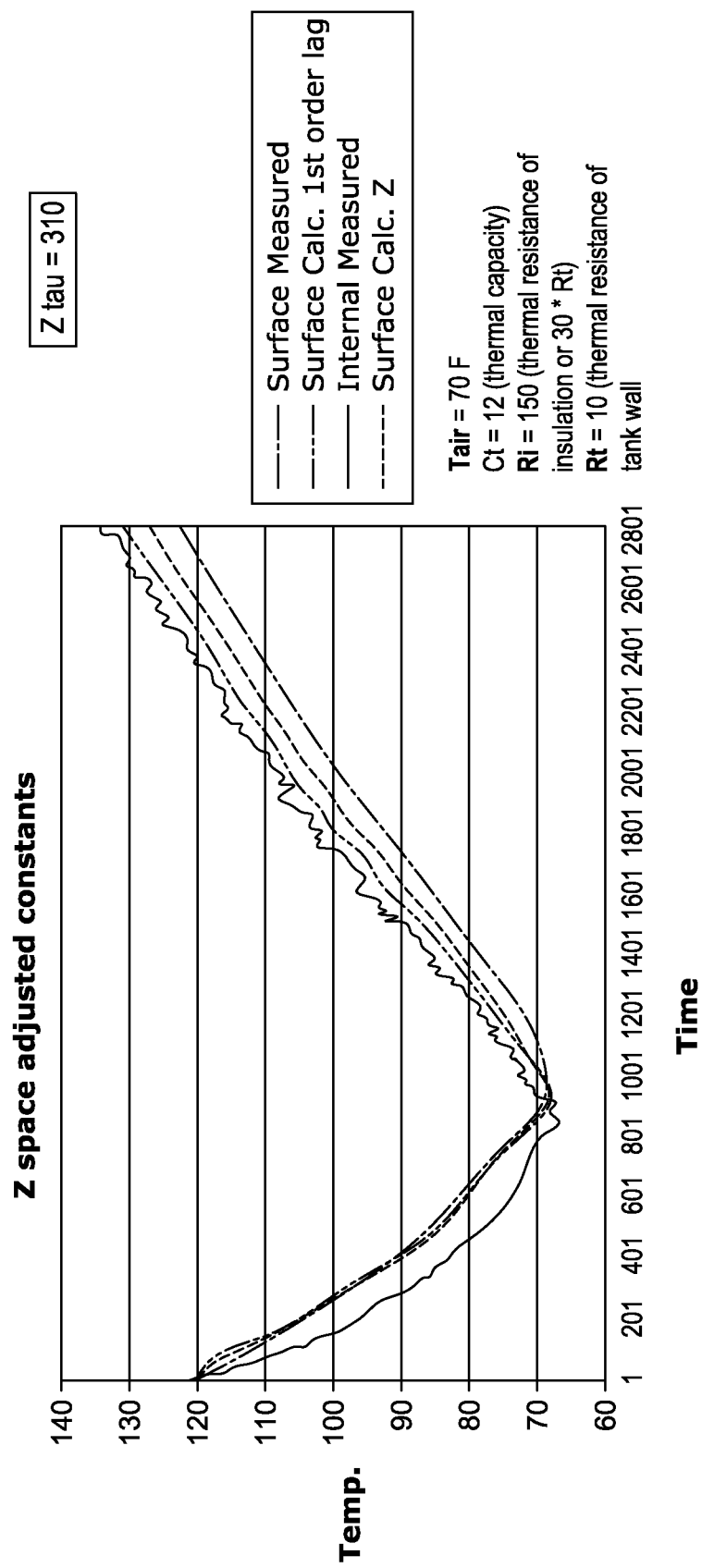
Figure 14:
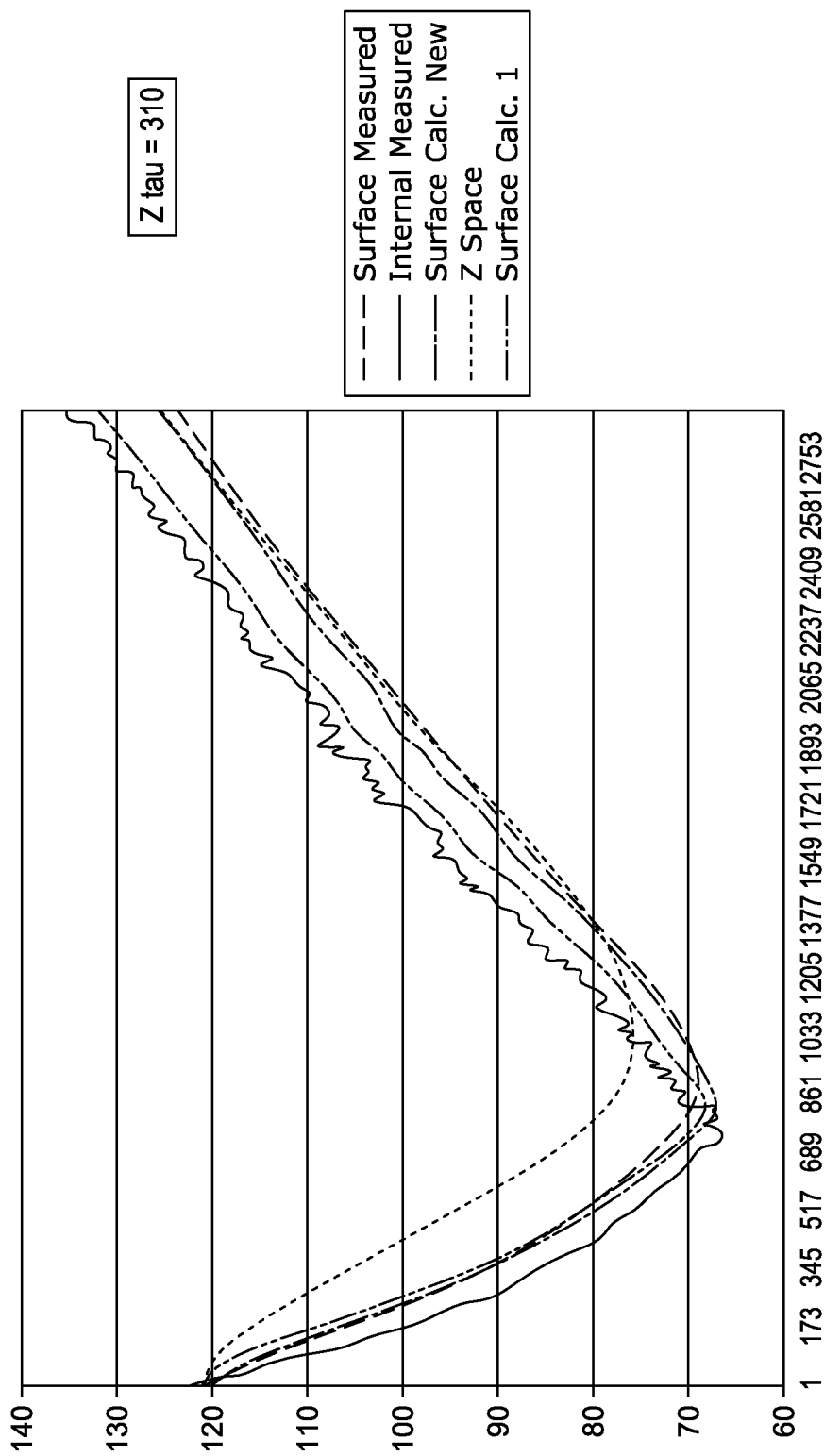

FIGS. 12 and 13 show that the resultant Z Transform is more accurate than the first order lag, but only slightly and only during the recovery period with a tau (or T) of 310. It can be seen that there is a slightly better fit in FIG. 13 as a result of adjusting some of the constants. It is believed, therefore, that the first order lag equation is sufficient in modeling during draw periods, but that the Z Transform is more accurate during recovery periods. FIG. 14 shows a calculated external partially thermally isolated temperature that is calculated using a first order lag during the draw portion, and a Z Transform during the recovery period. It can be seen that this appears to provide a calculated external partially thermally isolated temperature (based on the internal or actual water temperature) that most closely follows the actual measured external partially thermally isolated temperatures.

The final step in experimentation was to reverse the math in order to predict the internal temperature based upon the sensed external partially thermally isolated temperature measured by the partially thermally isolated temperature sensors. In an illustrative but non-limiting example, this was done using the first order lag modeling, using the following equation:

$$t_{internal} = t_{surface1} + (t_{surface2} - t_{surface1})/m,$$

where $t_{surface1}$ and $t_{surface\ 2}$ are temporally spaced external temperatures measured by the thermally isolated temperature sensors. It will be appreciated that the particular value for m may be tank-specific. It will also be appreciated, and given the previous discussion, the value of m may be changed depending on whether the water heater is undergoing a draw or is in recovery. In some cases, the value of m may depend at least in part upon a rate at which hot water is being drawn from the water heater. This may be determined, for example, by determining a rate at which the water temperature is dropping.

Figure 15:
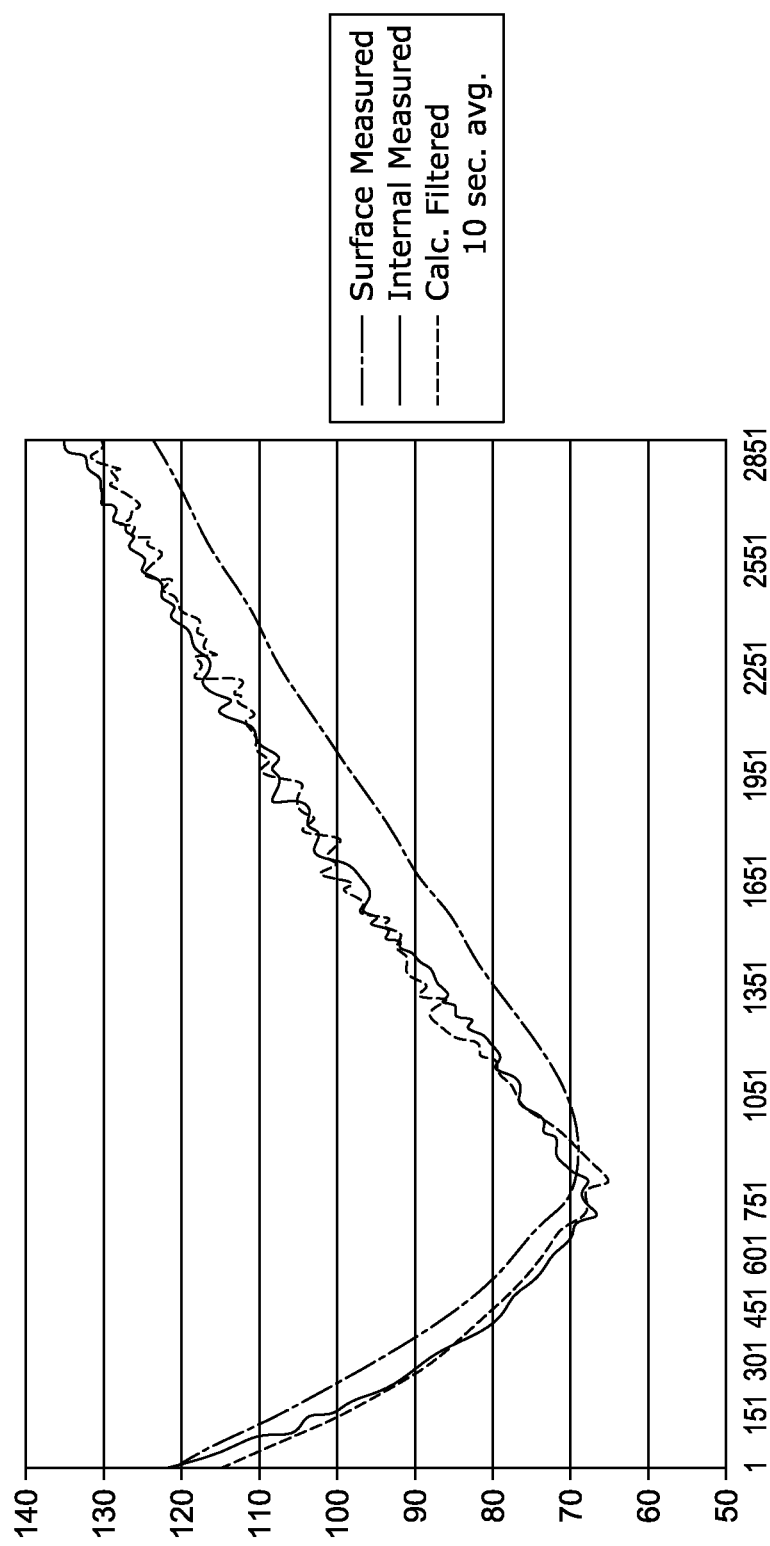

FIG. 15 shows a calculated internal temperature based on the external partially thermally isolated temperature values. Using the same data set with a variable speed running average (varying from 5 second averages to 30 second averages) proves to be a simple and accurate solution to reducing noise in the calculated response. It is contemplated that signal noise may also be reduced via an Analog to Digital conversion, but this is not required. For this Figure, m was set equal to 0.01105 during the draw period and was set equal to 0.003221 during the recovery period. It will be appreciated, of course, that these numbers are merely representative and are not considered to be limiting in any manner.

Figure 16:
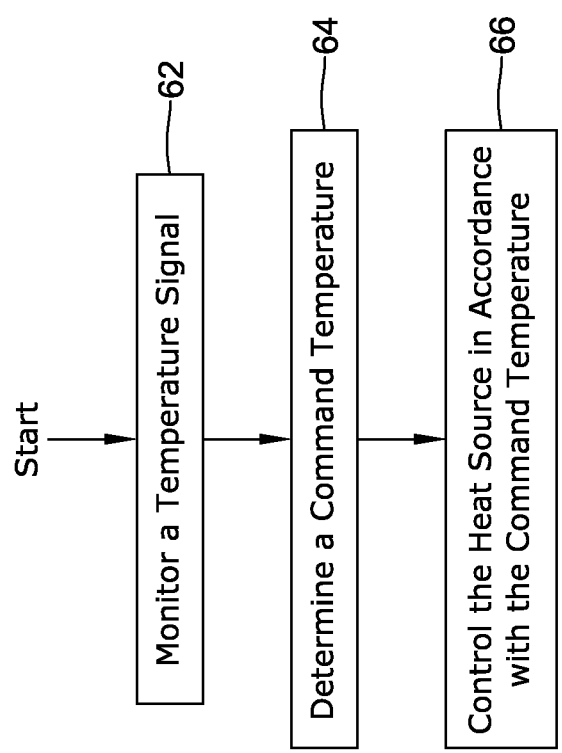
FIGS. 16-17 are flow diagrams showing illustrative but non-limiting examples of methods that may be carried out using the water heater of FIG. 1.
Figure 17:
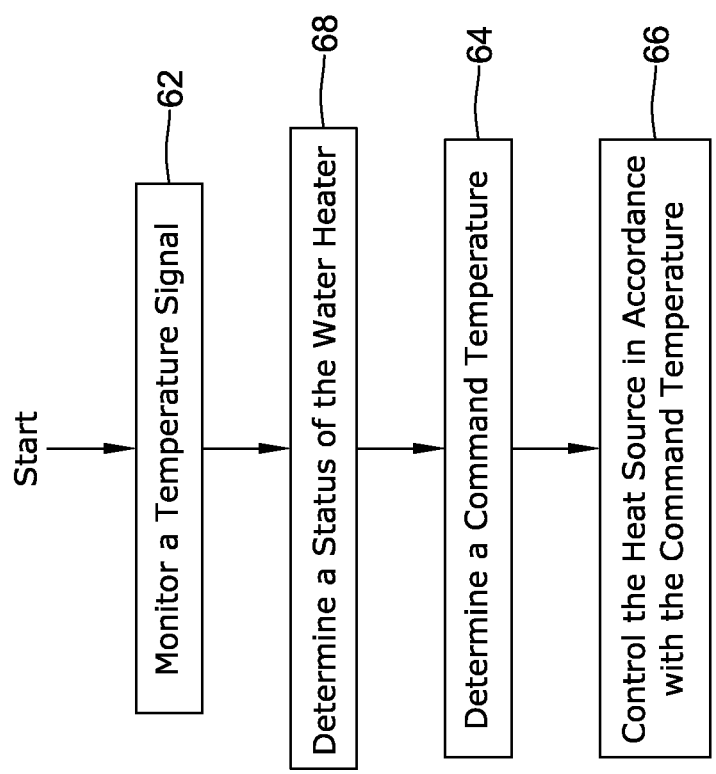

FIGS. 16-17 are flow diagrams showing methods that may be carried out using water heater 10. In FIG. 16, control begins at block 62, where a temperature signal is monitored. In some cases, controller 56 (FIG. 4) may monitor a temperature signal received from temperature sensing assembly 32 (FIG. 3), a temperature sensor thermally coupled to the outside of a water tank 12 but inside of any surrounding insulation, and/or any other suitable partially thermally isolated temperature sensor(s). At block 64, controller 56 determines a command temperature that in some cases accounts and/or compensates for a thermal differential and/or thermal lag caused by the partial thermal isolation of the temperature sensor from the water in the water tank.

In some cases, controller 56 may adjust the received temperature signal by a fixed amount to determine the command temperature. In some cases, controller 56 may utilize a mathematical relationship such as a first order lag and/or algorithm to determine the command temperature based upon the temperature signal received from the partially thermally isolated temperature sensor. Control passes to block 66, where controller 56 controls a heat source such as gas burner 24 (FIG. 1).

In FIG. 17, control begins at block 62, where a temperature signal is monitored. In some cases, controller 56 (FIG. 4) may monitor a temperature signal received from temperature sensing assembly 32 (FIG. 3), a temperature sensor thermally coupled to the outside of a water tank 12 but inside of any surrounding insulation, and/or any other suitable partially thermally isolated temperature sensor(s). At block 68, controller 56 determines a status of water heater 10 (FIG. 1). Control passes to block 64, where controller 56 (FIG. 4) determines a command temperature. Control passes to block 66, where controller 56 controls a heat source such as gas burner 24 (FIG. 1). It will be appreciated that while the flow steps are illustrated in a linear manner, the steps may take place in differing order. In some cases, some of the steps may overlap. For example, in some cases, controller 56 consistently monitors the temperature signals received from temperature sensing assembly 32 to determine the status of water heater 10.

In some cases, if the water temperature is holding steady or is only slowly dropping, controller 56 (FIG. 4) may determine that water heater 10 (FIG. 1) is within a standby period. Alternatively, if the water temperature is dropping at a faster rate, as indicated by the temperature signal, controller 56 may determine that water heater 10 is in a draw period in which significant amounts of hot water are being withdrawn from water heater 10.

If the water temperature is increasing, it will be recognized that the heat source is likely energized and water heater 10 is in a recovery period. In some cases, it will be appreciated that controller 56 (FIG. 4) may independently know that water heater 10 is in a recovery period by virtue of the heat source being energized. In some cases, controller 56 may adjust the temperature signal from temperature sensing assembly 32 by a fixed amount to determine the command temperature. In some cases, controller 56 may utilize a mathematical relationship such as a first order lag and/or a mathematical transformation to determine the command temperature based upon the temperature signal from temperature sensing assembly 32. The coefficients and/or mathematical relationships used may change depending on the current status or mode of water heater 10.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A water heater comprising:
    a temperature sensing assembly including:
        a housing that defines a polymeric well with an enclosed end and an open end;
        a temperature sensor situated in the polymeric well adjacent the enclosed end, with one or more sensor wires extending from the temperature sensor toward the open end;

a water tank for holding water, the water tank having a wall with an aperture extending through the wall, wherein at least part of the polymeric well of the housing extends through the aperture in the wall such that the enclosed end of the polymeric well is exposed to water in the water tank, at least part of the housing remaining outside of the water tank;

a heating source disposed proximate the water tank for heating the water in the water tank;

the temperature sensor of the temperature sensing assembly producing a temperature signal that is related to an actual temperature of the water in the water tank, wherein the temperature signal includes at least at times a thermal differential and/or thermal lag relative to the actual temperature of the water in the water tank due to a partial thermal isolation of the temperature sensor caused at least in part by the temperature sensor being separated from the water in the water tank by the polymeric well of the housing; and a controller in communication with the temperature sensor via the one or more sensor wires, the controller configured to determine, at least while the heating source is energized during a current heating cycle, a command temperature to be used in controlling the water heater during the current heating cycle, the command temperature based at least in part on the temperature signal in order to at least partially compensate for the thermal differential and/or thermal lag of the temperature signal, the controller further configured to regulate the heating source based at least in part upon the command temperature.

2. The water heater of claim 1, wherein the housing is configured to screw into threads of the water tank.

3. The water heater of claim 1, wherein the controller also determines a command temperature while the heating source is not energized to at least partially compensate for the thermal lag of the temperature signal.

4. The water heater of claim 3, wherein the controller determines the command temperature from the temperature signal using a first order approximation or a second order approximation.

5. The water heater of claim 4, wherein the first order approximation is changed to the second order approximation when a condition is detected.

6. The water heater of claim 1, wherein the controller is configured to determine if water is being drawn from the water tank or if the water heater is in a recovery period, based upon temperature changes measured by the temperature sensor.

7. The water heater of claim 1, wherein the controller determines the command temperature from the temperature signal using a first equation when the water heater is in a water draw period and a second equation when the water heater is in a recovery period.

8. The water heater of claim 7, wherein the controller determines the command temperature from the temperature signal using a third equation when the water heater is in a standby period.

9. The water heater of claim 1, wherein the command temperature represents an estimate, calculated by the controller, of an actual water temperature within the water tank.

10. A method of controlling water temperature of water within a water heater water tank, the water heater including a heat source and a temperature sensor that is disposed within a housing of a temperature sensing assembly, the housing including a polymeric well having an enclosed end and an open end, with the enclosed end extending into the water tank and exposed to water in the water tank, at least part of the housing remaining outside of the water tank, the temperature sensor producing a temperature signal that is related to an actual temperature of the water in the water tank, wherein the temperature signal includes at least at times a thermal differential and/or thermal lag relative to the actual temperature of the water in the water tank due to a partial thermal isolation of the temperature sensor caused at least in part by the temperature sensor being separated from the water in the water tank by the polymeric well of the housing, the method comprising the steps of:

monitoring the temperature signal provided by the temperature sensor;

determining, at least while the heat source is energized during a current heating cycle, a command temperature based on the temperature signal based at least in part on the temperature signal in order to at least partially compensate for the partial thermal isolation of the temperature sensor from the water in the water tank; and controlling the heat source during the current heating cycle based at least in part upon the command temperature.

11. The method of claim 10, further comprising determining an operating mode of the water heater by watching for changes in the temperature signal.

12. The method of claim 11, wherein the step of determining a command temperature comprises compensating in accordance with a first mathematical relationship when the water heater is in a water draw mode.

13. The method of claim 12, wherein the step of determining a command temperature comprises compensating in accordance with a second mathematical relationship when the water heater is in a recovery mode, wherein the second mathematical relationship is different from the first mathematical relationship.

14. The method of claim 13, wherein the step of determining a command temperature comprises compensating in accordance with a third mathematical relationship when the water heater is in a standby mode, wherein the third mathematical relationship is different from the first and second mathematical relationships.

15. The method of claim 10, wherein the step of determining a command temperature comprises compensating in accordance with a first order approximation to account for the thermal isolation of the temperature sensor.

16. The method of claim 10, wherein the water heater also includes an ambient temperature sensor, and the step of determining a command temperature further comprises accounting for an ambient temperature value.

17. A water heater comprising:

a temperature sensing assembly including:
  a housing that defines a polymeric well with an enclosed end and an open end;
  a temperature sensor situated in the polymeric well adjacent the enclosed end, with one or more sensor wires extending from the temperature sensor toward the open end;

a water tank for holding water, the water tank having a wall with an aperture extending through the wall, wherein at least part of the polymeric well of the housing extends through the aperture in the wall such that the enclosed end of the polymeric well is exposed to water in the water tank, at least part of the housing remaining outside of the water tank;

a heating source disposed proximate the water tank for heating the water in the water tank;

the temperature sensor of the temperature sensing assembly producing a temperature signal that is related to an actual temperature of the water in the water tank, wherein the temperature signal includes at least at times a thermal differential and/or thermal lag relative to the actual temperature of the water in the water tank due to a partial thermal isolation of the temperature sensor caused at least in part by the temperature sensor being separated from the water in the water tank by the polymeric well of the housing; and a controller in communication with the temperature sensor via the one or more sensor wires, the controller configured to determine a current command temperature based at least in part on a current temperature signal in order to at least partially compensate for the thermal differential and/or thermal lag of the temperature signal, the controller further configured to regulate the heating source based at least in part upon the current command temperature;

wherein the current command temperature represents an estimate, calculated by the controller, of an actual water temperature within the water tank.

18. The water heater of claim 17, wherein the controller determines the command temperature from the temperature signal using a first equation when the water heater is in the water draw period and a second equation when the water heater is in a recovery period.

19. The water heater of claim 18, wherein the controller determines the command temperature from the temperature signal using a third equation when the water heater is in a standby period.

* * * * *